US006939572B2

(12) United States Patent
Nguyen

(10) Patent No.: US 6,939,572 B2

(45) Date of Patent: Sep. 6, 2005

(54) CONFECTIONERY COMPOSITION

(75) Inventor: Isabelle Nguyen, Haguenau (FR)

(73) Assignee: Mars Incorporated, McLean, VA (US)

(*) Notice: Subject to any disclaimer, the term of this patent is extended or adjusted under 35 U.S.C. 154(b) by 222 days.

(21) Appl. No.: 10/244,357

(22) Filed: Sep. 16, 2002

(65) Prior Publication Data

US 2004/0022904 A1 Feb. 5, 2004

(30) Foreign Application Priority Data

Jul. 31, 2002 (FR) .......................................... 02 09773

(51) Int. Cl.$^{7}$ ............................................. A23L 1/27

(52) U.S. Cl. ...................... 426/250; 426/600; 426/302; 426/305

(58) Field of Search ................................ 426/540, 250, 426/302, 305, 660

(56) References Cited

U.S. PATENT DOCUMENTS

| | | | | |
|---|---|---|---|---|
| 3,963,700 A | | 6/1976 | Philip | 260/236.5 |
| 4,172,902 A | | 10/1979 | Asen | 426/250 |
| 4,274,830 A | | 6/1981 | Woznicki et al. | 8/495 |
| 4,307,117 A | | 12/1981 | Leshik | 426/96 |
| 4,452,822 A | | 6/1984 | Shrikhande | 426/49 |
| 4,713,252 A | | 12/1987 | Ismail | 426/290 |
| 6,190,686 B1 | | 2/2001 | Isager et al. | 424/439 |
| 6,572,906 B1 | * | 6/2003 | Higashimura et al. | 426/262 |
| 2002/0152927 A1 | | 10/2002 | Russell et al. | 106/31.13 |
| 2003/0082281 A1 | * | 5/2003 | Kohler et al. | 426/262 |
| 2004/0105919 A1 | * | 6/2004 | Chisholm | 426/250 |

FOREIGN PATENT DOCUMENTS

| | | | |
|---|---|---|---|
| DE | 28 20 981 | 4/1979 | |
| EP | 0007095 | 6/1980 | A23L/1/30 |
| EP | 0 387 739 | 9/1990 | |
| EP | 1 279 703 | 1/2003 | |
| JP | 2000-32954 | 2/2000 | |
| WO | WO 90/01270 | 2/1990 | |

* cited by examiner

*Primary Examiner*—N. Bhat

(74) *Attorney, Agent, or Firm*—Fitzpatrick, Cella, Harper & Scinto

(57) ABSTRACT

A blue anthocyanin and granulated sugar composition, in which a hard coated confectionery item comprising a core and at least one layer of the composition are provided together with a process for manufacturing the hard coated confectionery item and a syrup containing blue anthocyanin, and a process for stabilizing blue anthocyanin, by incorporation with granulated sugar.

18 Claims, No Drawings

CONFECTIONERY COMPOSITION

CROSS-REFERENCE TO RELATED APPLICATIONS

Priority is claimed under 35 U.S.C. 119(b) based on FR Application No. 0209773 filed Jul. 31, 2002.

TECHNICAL FIELD

The invention relates to a novel confectionery composition having a blue colour, obtained with a natural colouring and its method of preparation and a product useful for this purpose.

BACKGROUND OF THE INVENTION

Colourings are being increasingly used. In parallel, food additives which are of a natural origin are being sought. Natural colourings are therefore being sought. Up until now, no natural colouring exists which is blue in colour, except spirulina blue or linablue A, which is not authorized in Europe.

Anthocyanins and their derivatives are moreover known, whose colour varies according to the pH. It is known that at a pH greater than or equal to 7, the anthocyanins are blue in colour. However, these compounds pose problems of stability. U.S. Pat. No. 4,172,902 discloses gels of a particular source of anthocyanins, namely "Morning blue". At basic pH values (7 and 8), the colour is not stable for more than two days for buffered solutions. For gels, the stability is stated as being 320 hours, that is about two weeks. This duration is not satisfactory for products having optimum use-by dates of several weeks or several months. In addition, the gel form limits application to the fields cited in U.S. Pat. No. 4,172,902, namely icing, coulis, gelatin composition, ice products.

The company Fazer has been marketing a biscuit with icing based on (amorphous) icing sugar comprising, according to the information provided on the box, grape juice, in Finland since the end of 2000, under the name "CARNEVAL". This biscuit appears to apply the principles of icing developed in the U.S. patent cited above.

The document EP-A-0007095 discloses the stabilization of anthocyanins with an ascorbic acid derivative. By virtue of the nature of the stabilizing agent, the pH is strongly acidic, which prevents obtaining the blue colour.

The object of the invention is therefore to provide a composition containing a natural blue colour, which is stable and appropriate for the preparation of confectionery products.

The invention therefore provides a blue anthocyanin and granulated sugar composition.

According to one embodiment, the anthocyanin represents 0.5 to 0.10%, preferably 1 to 5% by weight of the composition.

According to one embodiment, the granulated sugar represents from 85 to 99.5%, preferably 95 to 99% by weight of the composition.

According to one embodiment, the composition comprises additives in a quantity of from 1 to 5% by weight, preferably less than 2%.

According to one embodiment, the composition consists of granulated sugar, anthocyanin in a quantity of from 1 to 5%, and additives in a quantity of up to 1%.

According to one embodiment, the composition comprises, in addition, a natural yellow colouring.

The subject of the invention is also a dragée or hard coated confectionery item comprising a core and at least one layer of the composition according to the invention.

The subject of the invention is also a process for manufacturing the dragée or hard coated confectionery item according to the invention, comprising the step of coating the core with a syrup containing blue anthocyanin.

The subject of the invention is also a syrup containing blue anthocyanin.

According to one embodiment, the syrup has a pH ranging from 7 to 9.

According to one embodiment, the syrup has a TS (Total Solids content) of 60 to 85, preferably 70–75.

The subject of the invention is finally a process for stabilizing blue anthocyanin, by incorporation with granulated sugar.

BRIEF SUMMARY OF THE INVENTION

A blue anthocyanin and granulated sugar composition, in which a hard coated confectionery item comprising a core and at least one layer of the composition are provided together with a process for manufacturing the hard coated confectionery item and a syrup containing blue anthocyanin, and a process for stabilizing blue anthocyanin, by incorporation with granulated sugar.

DETAILED DESCRIPTION OF THE INVENTION

The invention is now described in greater detail in the description which follows.

The term "blue colour" has the meaning normally attributed. Preferably, this term is defined in the L, a, b colorimetric system by the following values: L any value, a between −20 and +20, b between −60 and −30.

The term "sugar" has the common meaning in the confectionery art, namely in particular sucrose, glucose or dextrose syrups or mixtures thereof The invention provides a stabilized anthocyanin composition. This anthocyanin is any anthocyanin or its derivatives. In particular, it may be extracted from the elder, from the purple carrot, from the red cabbage, or from other sources such as grape or blackcurrant.

It has been found that this composition is particularly stable even after 6 months, whereas anthocyanin solutions are known to be particularly unstable in particular to high pH values.

Without wishing to be linked to any theory, the applicant thinks that the crystalline form of the sugar stabilizes the anthocyanin.

The applicant has found that an anthocyanin incorporated in granulated sugar retains its colour. An anthocyanin which is violet in colour remains of this colour once in sugar. Likewise, the blue colour persists once the anthocyanin is combined with granulated sugar.

The compositions according to the invention comprise variable quantities of anthocyanins, for example of between 0.5 and 10%, preferably 1 and 5% by weight relative to the weight of the composition. The remainder of the composition is sugars with optionally other additives conventionally used, normally in quantities of less than 5%, preferably less than 2%.

The granulated sugar represents in general from 85 to 99.5%, preferably 95 to 99%. Preferably, the outer layer consists of granulated sugar and anthocyanin, conventional additives being optionally added in small quantities, typically less than 1%.

The invention applies in particular to confectionery products of the dragée type, namely a core and a layer of granulated sugar.

The cores of the compositions of the dragée type are many. They may be a natural centre (almond, hazelnut, groundnut and the like) or a "confectionery" centre (boiled sweet, caramel, fondant, chocolate and the like). The cores may then be coated with chocolate, with successive layers of sugars or other substances such as polyols, gums and natural polymers.

The process for manufacturing compositions of the dragée type is the conventional coating process comprising the deposition of a plurality of sublayers, for example between 5 and 30, by a succession of phases of application and drying carried out, for example, in a pan.

Other conventional processes allowing the production of granulated sugar are also possible. There may be mentioned the technologies using coating films, which were first applied in the pharmaceutical industry and which are increasingly encountered in confectionery for dragées or hard coated confectionery products.

The aqueous solution used in this coating process comprises a syrup supplemented with an anthocyanin, at an appropriate pH which is typically between 7 and 9. The total solids content (TS) of the syrup is typically between 60 and 85, for example about 70–75. The pH is adjusted to the required value (according to the type of anthocyanin selected) by adding an appropriate buffer, for example based on sodium hydroxide.

The invention therefore allows a stable natural blue colour to be obtained. As a mixture with a colouring of the natural yellow type (for example curcumin or lutein), a stable natural green colouring is thus obtained, which was not possible up until now.

The invention is illustrated by the nonlimiting examples below.

EXAMPLES

A solution of red cabbage anthocyanin is prepared from powdered colouring (anthocyanin supported on maltodextrin) in water. The colouring:water weight ratio is 30:70.

The pH of the solution is 3.5. The colour is violet.

This same solution is supplemented with 1 M sodium hydroxide until the colour is established at blue (at pH 6.06, the colour is appreciably violet). The pH of the final solution retained is 7.9.

A sugar syrup having a TS of 73 is prepared in parallel. The pH of this syrup is about 8.4.

Three parts by weight of each solution of colouring are mixed with 97 parts by weight of syrup. The final coloured syrup has, in each case, the same colour as the starting solution. The pH of the violet syrup is about 4 while the pH of the blue syrup is about 7.9.

With these coloured syrups, a core comprising a groundnut and a chocolate layer is coated under conventional conditions. Dragées having the colour of the starting coloured syrup are obtained after about 20 passes. The layer contains about 98.5% of granulated sugar and about 1.5% of blue anthocyanin.

These dragées are placed in packets in which they are usually sold. The packets are stored at ambient temperature, with no special precautions.

After more than 12 months, the colour of the dragées remains unchanged.

Two stability tests were also carried out in a saturated atmosphere in a closed chamber, for 7 days. In the first chamber is placed a container of HCl in sufficient quantity to saturate the atmosphere up to a pH of about 3.5 (pH paper). In the second chamber is placed a container of aqueous ammonia in a sufficient quantity to saturate the atmosphere up to a pH of 10–10.5 (pH paper). After having been kept in the oven in an acidic atmosphere, the dragées have a violet colour while the dragées which were kept in the basic atmosphere have a bronze green colour.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A hard coated confectionery product comprising a center core and at least one layer of a composition comprising blue anthocyanin and crystallised sugar.

2. The hard coated confectionery product according to claim 1, in which the anthocyanin makes up 0.5 to 0.10%, of the composition.

3. The hard coated confectionery product according to claim 2, in which the anthocyanin makes up from 1 to 5% by weight, of the composition.

4. The hard coated confectionery product according to claim 1, in which the crystallised sugar makes up from 85–99.5%, of the composition.

5. The hard coated confectionery product according to claim 4, in which the crystallised sugar makes up from 95–99% by weight, of the composition.

6. The hard coated confectionery product according to claim 1, wherein the compisition comprises additives in an amount of from 1 to 5% by weight.

7. The hard coated confectionery product according to claim 6, wherein the composition comprises additives in an amount of less than 2% by weight.

8. The hard coated confectionery product according to claim 1, wherein the composition further comprises a natural yellow colouring agent.

9. A hard coated confectionery product comprising a center core and at least one layer of a composition of blue anthocyanin and crystallised sugar, constituted by crystallised sugar, anthocyanin in an amount of from 1 to 5%, and additives in an amount of up to 1%.

10. The composition according to claim 9, wherein the composition further comprises a natural yellow colouring agent.

11. A method for producing a hard coated confectionery product comprising a center core and at least one layer of a composition comprising blue anthocyanin and crystallised sugar, comprising the step of hard coating the center core with a syrup containing blue anthocyanin.

12. The method for producing a hard coated confectionery product according to claim 11, in which the pH of the syrup ranges from 7–9.

13. The method for producing a hard coated confectionery product according to claim 11, in which the syrup has a total solids content of 60 to 85.

14. The method for producing a hard coated confectionery product according to claim 13, in which the syrup has a total solids content of 70 to 75.

15. A method for producing a hard coated confectionery product comprising a center core and at least one layer of a composition constituted by crystallised sugar, anthocyanin in an amount of from 1 to 5%, and additives in an amount of up to 1%, comprising the step of hard coating the center core with a syrup containing blue anthocyanin.

16. The method for producing a hard coated confectionery product according to claim 15, in which the pH of the syrup ranges from 7–9.

17. The method for producing a hard coated confectionery product according to claim 15, in which the syrup has a total solids content of 60 to 85.

18. The method for producing a hard coated confectionery product according to claim 17, in which the syrup has a total solids content of 70 to 75.

* * * * *